Patented June 7, 1927.

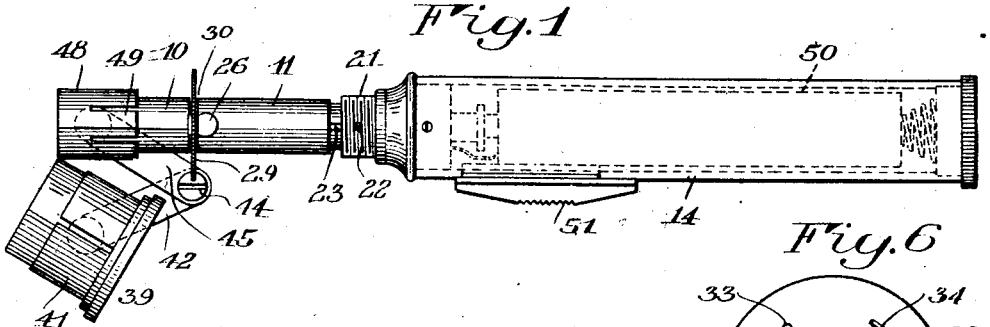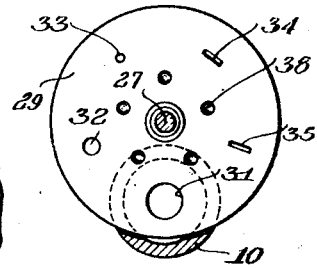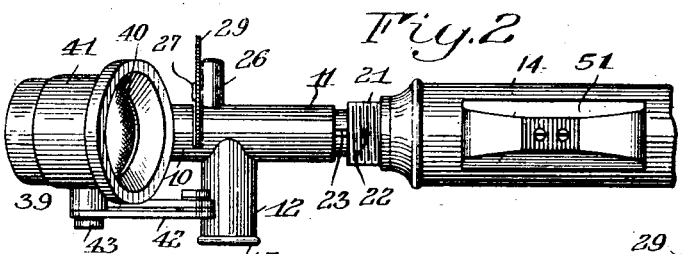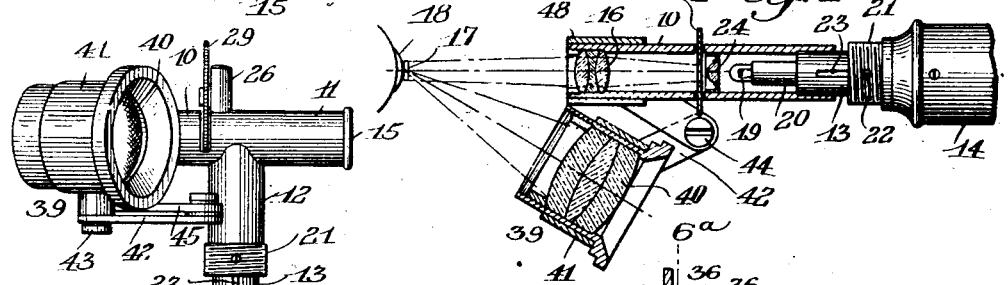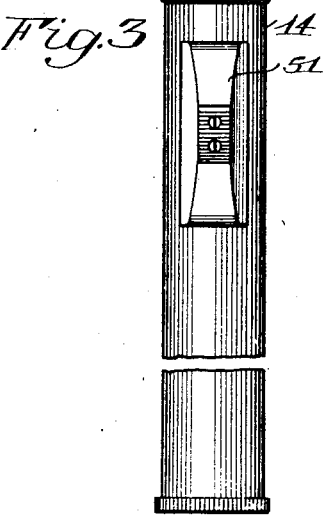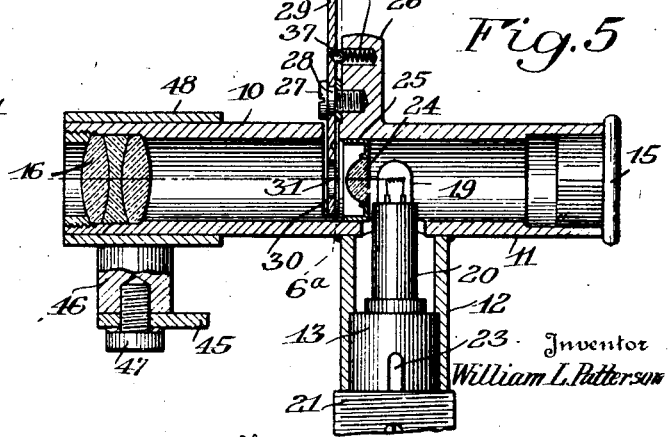

1,631,329

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL INSTRUMENT.

Application filed April 29, 1925. Serial No. 26,759.

The present invention relates to optical instruments and has for its object to provide an improved hand instrument of the type particularly adapted for making preliminary examinations of the eye or other objects which can best be studied microscopically under illumination.

A further object of the invention is to provide a small, compact, self-contained and economically constructed hand instrument of the character described herein, which is made conveniently adjustable for use by the operator with either eye and having other features of adjustment including a handle or support movable to different positions upon the instrument.

A further object of the invention is to provide a compact, easily controlled hand instrument embodying a lamp and a focusing or light projecting lens adapted to afford a concentrated light upon the object to be examined together with a magnifying eye piece adjustable for viewing the illuminated object from different directions, along with improved means for regulating the size and shape of the concentrated light under which the microscopic examination is made.

To these and other ends the invention resides in certain improvements and combinations of parts, all as will be hereinafter more fully described, the novel features being pointed out in the claims at the end of the specification.

In the drawings:—

Figure 1 is a top plan view of an instrument embodying one form of the invention;

Figure 2 is a fragmentary side elevation of the instrument shown in Figure 1 with a portion of the handle broken away;

Figure 3 is a view similar to Figure 2 with the handle disposed at a right angle to the body of the instrument;

Figure 4 is a horizontal sectional view taken longitudinally and centrally of the lens tube and eye piece;

Figure 5 is an enlarged vertical section through the lens tube, and

Figure 6 is a transverse section taken on line 6ª—6ª of Figure 5.

Similar reference numerals throughout the several views indicate the same parts.

The present invention is designed especially for use by physicians and others qualified to determine the different pathological conditions of the eye and is therefore particularly useful in diagnostic work where it is desired to determine whether or not the condition of the eye is such as to effect other parts of the system or whether or not the patient is in need of glasses or treatments by an oculist.

The embodiment of the invention herein disclosed, by way of illustration, comprises a lens tube or casing 10 having angularly disposed tubular or recessed portions 11 and 12, the former being a continuation of the lens tube and the latter projecting laterally therefrom, preferably at a right angle as shown in Figures 2 and 3. Both portions 11 and 12 are adapted to receive an extension 13 of a handle 14 by which arrangement the handle may be adjustably positioned to suit different operating conditions or to satisfy the individual requirements or preferences of different users. A cap 15 is provided for closing either one of the tubular members 11 or 12 when the extension 13 of the handle is disposed within the other of said members, the cap being constructed and applied as shown in Figure 5.

The lens tube or casing 10 is provided with a suitable focusing lens 16, preferably having a relatively short focal length whereby to afford a concentrated light relatively close to the instrument so that the latter may be brought comparatively close to the eye of the patient in order to obtain a relatively large field of vision. By way of example the light is shown concentrated at 17 on the retina of the eye, indicated at 18 in Figure 4. The light source preferably comprises an electric light 19 in a socket 20 slidably disposed within the extension 13 of the handle 14, a thumb piece 21 being sleeved upon the extension 13 and connected with the socket member 20 by a pin 22 movable in a slot 23 of the extension whereby the lamp may be adjusted longitudinally of the handle to be accurately centered within the lens tube as shown in Figure 5.

A condensing lens 24 is disposed within the lens tube in front of the lamp and is carried by a suitable holder 25 as shown in Figure 5.

The lens casing is provided with a laterally projecting member 26 having a screw 27 threaded therein and provided with a bearing 28 upon which is rotatably mounted a diaphragm 29, preferably in the form of a disk, movable in a transverse slot 30 formed in the lens tube. The disk is provided with a series of different sized circular apertures as indicated at 31, 32 and 33 in Figure 6, each of which is adapted to be brought into registry with the condenser 24 by rotation of the disk whereby the area and intensity of the concentrated light indicated at 17 may be increased or diminished as desired. The diaphragm plate is also preferably provided with apertures 34 and 35, both of which are of the slit type, one adapted to extend horizontally in front of the lens and the other vertically when in light transmitting position. The diaphragm is yieldably held in its different positions of adjustment by a spring 36 operating upon a ball 37 adapted to engage in a series of depressions 38 formed in the back of the diphragm plate as shown in Figure 6, all of which are equidistant from the axis of rotation of the plate and each of which is diametrically disposed opposite one of the apertures.

The eye piece indicated generally at 39 may embody any suitable magnifying lens or lens system, such as that shown at 40 in Figure 4, the focal length of which is preferably made substantially the same as that of the objective 16. The eye piece is made adjustable to any angle desired with respect to the axis of the objective, on either side of the instrument, so that the operator may readily shift it from one eye to the other whereby to more conveniently examine the eyes of the patient or other objects to be viewed. Such adjustment not only permits moving the eye piece to different angles in a horizontal plane but also to different angles in a vertical plane. These adjustments are afforded by mounting the eye piece on an adjustable support, such as that shown in Figure 1 embodying a split ring 41 within which the eye piece is removably inserted, the ring being rotatable upon an arm 42 through a pivot member 43. The arm 42 is pivoted at 44 upon an inner arm 45 which is pivotally connected with a block or post 46 by means of a stud 47. The post 46 is suitably connected with and supported by a sleeve 48 which is both rotatably and slidably mounted upon the outer end of the lens tube. The sleeve is slotted to afford one or more spring fingers 49 so that it will firmly grip the tube and remain in any position to which it may be moved whereby to support the eye piece at the desired angle with respect to the axis of the light projecting lens system. It will thus be seen that the eye piece is mounted for universal movement on the lens tube and may be revolved about the axis thereof by rotating the sleeve 48 or it may be rotated upon the pivot 43 or the arms 42 and 45 swung one relative to another to vary the angle between the axis of the eye piece and the axis of the objective, or the arm 45 rotated upon the pivot 47, each of which adjustments may be made independently of the other.

The handle is provided with a dry battery 50 for supplying current to the lamp 19, the light being turned on or off when desired by a suitable switch operated by a slidably disposed finger piece 51 in a well known manner.

The extension 13 of the handle is adapted to be frictionally held within the recessed portions 11 and 12 of the casing and may be quickly withdrawn from either of said portions and inserted in the other as desired. Likewise the supporting sleeve 48 of the eye piece may be easily slipped on and off the lens tube and the eye piece 39 removed from the split ring 41 by a sliding movement, said parts being therefore easy to assemble and readily removable to facilitate cleaning or packing as desired.

I claim as my invention:

1. In an optical instrument, a casing, a lamp disposed within the casing, a light-projecting lens within the casing, an adjustable diaphragm operable within the casing between the lens and lamp, a condenser between the lamp and diaphragm and an eye piece embodying a magnifying lens mounted for universal movement upon the casing whereby its optical axis is adapted to intersect that of said projecting lens at different distances from the latter.

2. In an optical instrument, a casing, a lamp projecting within the casing, a focusing light-projecting lens within the casing, a diaphragm plate adjustably connected with the casing for movement therein between said lens and lamp and having different size apertures, a condenser between the diphragm and lamp and an eye piece embodying a magnifying lens mounted for adjustment upon opposite sides of the casing in either of which positions its optical axis is adapted to extend obliquely to intersect that of said projecting lens substantially at the focal point of the latter.

3. In an optical instrument, a casing, a lamp disposed within the casing, a focusing lens mounted within the casing, a condenser disposed between the lamp and lens, an adjustable diaphragm between the condenser and lens and an eye piece adjustable upon the casing to different angles with respect to the optical axis of said lens.

4. In an optical instrument, a casing, a lamp therein, a focusing lens within the casing, a member projecting from the casing, a diaphragm plate rotatable upon said member to move within the casing through a slot formed therein and having different sized apertures, means for yieldably holding the diaphragm plate in different positions of adjustment, a light projecting lens within the casing adapted to focus the light in front of the instrument a condenser disposed between said lens and the lamp and a magnifying lens adjustable to different angular positions upon the casing in any of which positions its optical axis is adapted to extend obliquely to that of said focusing lens.

5. In an optical instrument, a casing, a handle adapted to be adjusted to different angular positions thereon, a lamp within the casing, a light-projecting lens within the casing adapted to focus the light at a point spaced therefrom, and an eye piece adjustable upon the casing whereby its optical axis is adapted to intersect the focal point of said lens in different positions of adjustment.

6. In an optical instrument, a casing having angularly disposed portions, a handle for the instrument adapted to be connected with each of said portions, a lamp carried by the handle in either of its positions, a light-projecting lens within the casing adapted to focus the light at a point spaced therefrom, and an eye piece embodying a magnifying lens adjustable upon the instrument so that its optical axis will intersect that of the light-projecting lens in different positions of adjustment.

7. In an optical instrument, a casing having angularly disposed recessed portions, a support having an extension insertable in either of said recessed portions, a light source upon the extension, a focusing light-projecting lens within the casing and an eye piece embodying a magnifying lens mounted for adjustment upon opposite sides of the instrument in either of which positions its optical axis is adapted to intersect that of the projecting lens substantially at the focal point of the latter.

8. In an optical instrument, a casing having angularly disposed recessed portions, a support having an extension insertable in either one of said recessed portions, a light source upon the extension, a focusing light-projecting lens within the casing, a selective diaphragm interposed between the light source and said lens and an eye piece embodying a magnifying lens mounted for adjustment upon opposite sides of the instrument in either of which positions its optical axis is adapted to intersect that of the projecting lens substantially at the focal point of the latter.

9. In an optical instrument, a casing having angularly disposed recessed portions, a handle for supporting the instrument having one end adapted for insertion within either of said recessed portions, an electric lamp on said handle, a focusing light-projecting lens within the casing, a diaphragm plate rotatably disposed upon the casing for movement therein between said lens and lamp and having different sized apertures, and an eye piece embodying a magnifying lens mounted for adjustment upon opposite sides of the instrument in either of which positions its optical axis is adapted to intersect that of said projecting lens substantially at the focal point of the latter.

10. In an optical instrument, a tube, a tubular extension projecting laterally therefrom, a handle having a portion adapted to fit within one end of said tube and also within said tubular extension, a lamp carried by said portion and adapted to lie within the tube for either position of the handle, a light-projecting lens disposed within the tube and adapted to focus the light in front of the instrument, and an eye piece adjustable upon the tube to different angles with respect to the axis of said light-projecting lens.

WILLIAM L. PATTERSON.